United States Patent
Eran et al.

(10) Patent No.: US 11,991,073 B1
(45) Date of Patent: May 21, 2024

(54) DUAL SOFTWARE INTERFACES FOR MULTIPLANE DEVICES TO SEPARATE NETWORK MANAGEMENT AND COMMUNICATION TRAFFIC

(71) Applicant: MELLANOX TECHNOLOGIES, LTD., Yokneam (IL)

(72) Inventors: Haggai Eran, Yokneam Ilit (IL); Inbal Gal, Ramat Gan (IL); Guy Rozenberg Kunievsky, Rehovot (IL); Jason Gunthorpe, Bedford (CA); Liran Liss, Atzmon-Segev (IL); Vladimir Koushnir, Rishon le Zion (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/200,443

(22) Filed: May 22, 2023

(51) Int. Cl.
| | |
|---|---|
| *G06F 15/16* | (2006.01) |
| *H04L 41/044* | (2022.01) |
| *H04L 45/302* | (2022.01) |
| *H04L 47/2483* | (2022.01) |

(52) U.S. Cl.
CPC .......... *H04L 45/306* (2013.01); *H04L 41/044* (2013.01); *H04L 47/2483* (2013.01)

(58) Field of Classification Search
CPC ............................ H04L 45/306; H04L 41/044
See application file for complete search history.

(56) References Cited

U.S. PATENT DOCUMENTS

| | | | | |
|---|---|---|---|---|
| 7,257,758 | B1* | 8/2007 | Manula | H04L 1/0061 |
| | | | | 714/752 |
| 7,668,981 | B1* | 2/2010 | Nagineni | H04L 43/16 |
| | | | | 710/36 |
| 8,886,783 | B2* | 11/2014 | Johnsen | H04L 41/12 |
| | | | | 709/223 |
| 9,998,359 | B2* | 6/2018 | Itkin | H04L 45/245 |
| 10,225,153 | B2* | 3/2019 | Chen | H04L 67/1097 |
| 10,382,396 | B2* | 8/2019 | Itkin | H04L 63/0236 |
| 11,750,513 | B2* | 9/2023 | Bogdanski | H04L 45/64 |
| | | | | 709/238 |
| 11,909,671 | B1* | 2/2024 | Barrantes Chaves | H04L 49/65 |
| 2003/0120852 | A1* | 6/2003 | McConnell | G06F 13/385 |
| | | | | 710/316 |
| 2004/0001503 | A1* | 1/2004 | Manter | H04L 49/252 |
| | | | | 370/360 |
| 2004/0213220 | A1* | 10/2004 | Davis | H04L 61/10 |
| | | | | 370/465 |
| 2005/0271073 | A1* | 12/2005 | Johnsen | H04L 49/358 |
| | | | | 370/428 |

(Continued)

OTHER PUBLICATIONS

U.S. Appl. No. 18/073,662, filed Dec. 2, 2022, Bashan et al.

(Continued)

*Primary Examiner* — Hieu T Hoang
(74) *Attorney, Agent, or Firm* — Sheridan Ross P.C

(57) ABSTRACT

A device, communication system, and method are provided. In one example, a system for routing traffic is described that includes a network device. The network device includes a plurality of ports to facilitate communication over a plurality of planes in a multiplane network. The network device also includes a first interface that presents the plurality of ports as a single plane agnostic port to software, and a second interface that presents each port in the plurality of ports as a separate port to the software.

20 Claims, 4 Drawing Sheets

(56) References Cited

U.S. PATENT DOCUMENTS

| | | | |
|---|---|---|---|
| 2005/0273641 A1* | 12/2005 | Sandven | H04J 3/0608 713/600 |
| 2006/0006905 A1* | 1/2006 | Chou | G06F 13/4031 326/40 |
| 2010/0095064 A1* | 4/2010 | Aviles | H04L 67/1097 711/118 |
| 2010/0115174 A1* | 5/2010 | Akyol | G06F 13/385 710/316 |
| 2011/0228789 A1* | 9/2011 | Jia | H04L 45/00 370/401 |
| 2013/0054947 A1* | 2/2013 | Gavrilov | G06F 9/4401 713/2 |
| 2013/0347092 A1* | 12/2013 | McBrearty | G06F 21/34 726/9 |
| 2014/0112338 A1* | 4/2014 | Huang | G06F 13/385 370/389 |
| 2014/0177639 A1* | 6/2014 | Vershkov | H04L 45/58 370/401 |
| 2014/0211808 A1* | 7/2014 | Koren | H04L 41/046 370/401 |
| 2014/0301401 A1* | 10/2014 | Wang | H04L 49/70 370/409 |
| 2015/0172112 A1* | 6/2015 | Itkin | H04L 45/245 370/254 |
| 2015/0338909 A1* | 11/2015 | Woodruff | G06F 1/325 713/323 |
| 2017/0302525 A1* | 10/2017 | Chen | H04L 45/00 |
| 2017/0324681 A1* | 11/2017 | Johnsen | H04L 49/25 |
| 2019/0007346 A1* | 1/2019 | Johnsen | H04L 45/48 |
| 2020/0104275 A1* | 4/2020 | Sen | G06F 9/544 |
| 2021/0152494 A1* | 5/2021 | Johnsen | H04L 47/2433 |
| 2022/0335563 A1* | 10/2022 | Elzur | G06T 1/20 |

OTHER PUBLICATIONS

U.S. Appl. No. 18/114,860, filed Feb. 27, 2023, Levi et al.
U.S. Appl. No. 18/120,822, filed Mar. 13, 2023, Menes et al.
U.S. Appl. No. 18/132,519, filed Apr. 10, 2023, Eran et al.

* cited by examiner

DUAL SOFTWARE INTERFACES FOR MULTIPLANE DEVICES TO SEPARATE NETWORK MANAGEMENT AND COMMUNICATION TRAFFIC

CROSS-REFERENCE TO RELATED APPLICATION

This application is related to U.S. patent application Ser. No. 18/114,860, titled "SYSTEMS, METHODS, AND DEVICES FOR MANAGING MULTIPLANE NETWORKS," filed on Feb. 27, 2023, the entire disclosure of which is incorporated herein by reference in its entirety.

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types.

Software interfaces allow various software applications to communicate with each other and with a hardware's internal system. Software interfaces typically control a system's resources, such as its memory, storage space, and central processing unit (CPU). Software interfaces can also give applications restricted access to these resources to better ensure a system's overall stability and functionality.

BRIEF SUMMARY

Network topology describes the arrangement of the network elements (links, nodes, etc.) of a communication network. Network topology is the structure of a network and may be depicted physically or logically. Physical topology is the placement of the various components of a network (e.g., device location and cable installation), while logical topology illustrates how data flows within a network. Logically, a network may be separated into separate parallel, lower bandwidth networks (e.g., separate planes), which allows support of larger scale networks at lower latency. The number of planes may vary and depend on the topology structure of a network and the number of connected devices.

Throughout the instant description, a switch integrated circuit (IC) should generally be understood to comprise switching hardware, such as an application specific integrated circuit (ASIC) that has switching capabilities. Multiplane network devices and non-multiplane network devices used in multiplane networks described herein may each include a single switch IC or multiple switch ICs.

The present disclosure relates to network devices for a multiplane network (also called a planarized network or planarization or the like). A multiplane network may be implemented by dividing the switching fabric of a traditional communication network into multiple planes. For example, a related art, non-multiplane network device for High Performance Computing (HPC) systems may include a single high-bandwidth switch IC that is managed on a per-switch IC basis along with other high-bandwidth switches in the same network device or in other network devices of the switching fabric.

A multiplane network device according to inventive concepts, however, is a network device having multiple smaller-bandwidth switch ICs that, when taken collectively, have an aggregated bandwidth equal to the single high-bandwidth switch IC of the related art. In addition, the multiple smaller bandwidth switch ICs of a multiplane network device may not be visible to the user (e.g., the multiple switch ICs are not exposed to an application programming interface (API) that enables user interaction with the network so that applications can use the network without being aware of the planes). Stated another way, the system is constructed such that applications perceive the multiple smaller bandwidth switch ICs of a multiplane network device as a single, larger bandwidth switch IC. In some situations, the different planes (e.g., the multiple switch ICs) are exposed (e.g., for lower-level management to a subnet manager). Applications may use a local network stack and host channel adapter (HCA) interfaces to communicate with multiplane network devices.

In network devices on multiplane networks, each port of the network device may be associated with a plane, however, the existence of the multiple planes may be abstracted into a single unified port exposed to an endpoint. Yet, some network management tools require accessing specific network planes hidden beneath the abstraction. By using the protocol stack, a distinctive split between the bond devices and their components may be created. Another alternative is to expose the plane concept throughout the software management stack, breaking the abstraction and existing software conventions.

Most applications may not need to know nor care how network traffic reaches its destination. Rather, applications want such traffic to be balanced between the different planes, so that the traffic may utilize all of the planes and reach a larger aggregate bandwidth with less queuing delays, but this balancing task can be hidden beneath a layer of abstraction that provides the application with a single networking device.

However, some management applications do need to access specific planes. For example, a subnet manager may send a command to a specific switch IC to discover the components connected to that IC, as part of the process of discovering the network's logical topology. These commands use source routing, so the subnet manager specifies the route to its destination. If that command is sent on a different plane, it would not reach the correct destination. Therefore, in such cases, the application (the subnet manager in our example) must have control over the chosen plane.

The present disclosure discusses a system and method for presenting a multiplane network device as two separate network devices. A first device is presented to the system as a network device with a single plane agnostic port, abstracting the different planes beneath it. This first device is used for communication traffic (e.g., remote direct memory access (RDMA), IP over InfiniBand (IPoIB), etc.). A second device is presented to the system as a multiport network device where each port is associated with a plane. In other words, the planes are not abstracted, and each plane is exposed as a separate port on this second device. This second device is used for traffic that is directed to a specific plane (e.g., network management traffic). In embodiments, management tools and the subnet manager use this device.

Embodiments of the present disclosure aim to solve the above-noted shortcomings and other issues by implementing an improved routing approach. The routing approach depicted and described herein may be applied to a switch, a router, or any other suitable type of networking device known or yet to be developed. As will be described in further detail herein, a switch that implements the routing approaches described herein may correspond to an optical routing switch (e.g., an Optical Circuit Switch (OCS)), an electrical switch, a combined electro-optical switch, or the like.

In an illustrative example, a network device is disclosed that includes a plurality of ports to facilitate communication over a network including a plurality of planes, wherein each port in the plurality of ports communicates over a plane in the plurality of planes; a first interface to manage the plurality of ports, wherein the first interface presents the plurality of ports as a single port to software; and a second interface to manage the plurality of ports, wherein the second interface presents each port in the plurality of ports as a separate port to the software.

In another example, a system is disclosed that includes: a network device including: a plurality of ports to facilitate communication over a plurality of planes in a network, wherein each port in the plurality of ports communicates over a plane in the plurality of planes; a first interface to manage the plurality of ports, wherein the first interface presents the plurality of ports as a single plane agnostic port to software; and a second interface to manage the plurality of ports, wherein the second interface presents each port in the plurality of ports as a separate port to the software.

In yet another example, a method of routing data packets is disclosed that includes: routing the data traffic over a multiplane network via a plurality of ports; routing a first type of traffic via a first interface, wherein the first interface presents the plurality of ports as a single plane agnostic port to software; and routing a second type of traffic via a second interface, wherein the second interface presents each port in the plurality of ports as a separate port.

Any of the above example aspects include wherein the first interface handles a first type of traffic, and the second interface handles a second type of traffic.

Any of the above example aspects include wherein the first type of traffic is different from the second type of traffic.

Any of the above example aspects include wherein the first type of traffic comprises communication traffic.

Any of the above example aspects include wherein the first type of traffic comprises Remote Direct Memory Access (RDMA).

Any of the above example aspects include wherein the plurality of ports presented as the single port to the software comprises a plane agnostic port.

Any of the above example aspects include wherein the second type of traffic comprises network management traffic.

Any of the above example aspects include wherein the network device comprises a host channel adapter (HCA).

Any of the above example aspects include wherein a subnet manager (SM) interacts with the second interface.

Any of the above example aspects include wherein the plurality of ports are grouped into one or more sets of ports, and wherein each set of ports represents a different logical port.

Any of the above example aspects include wherein the network device comprises a server.

Any of the above example aspects include wherein the multiplane network comprises a plurality of planes, and wherein the second interface exposes each plane in the plurality of planes as a separate port.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
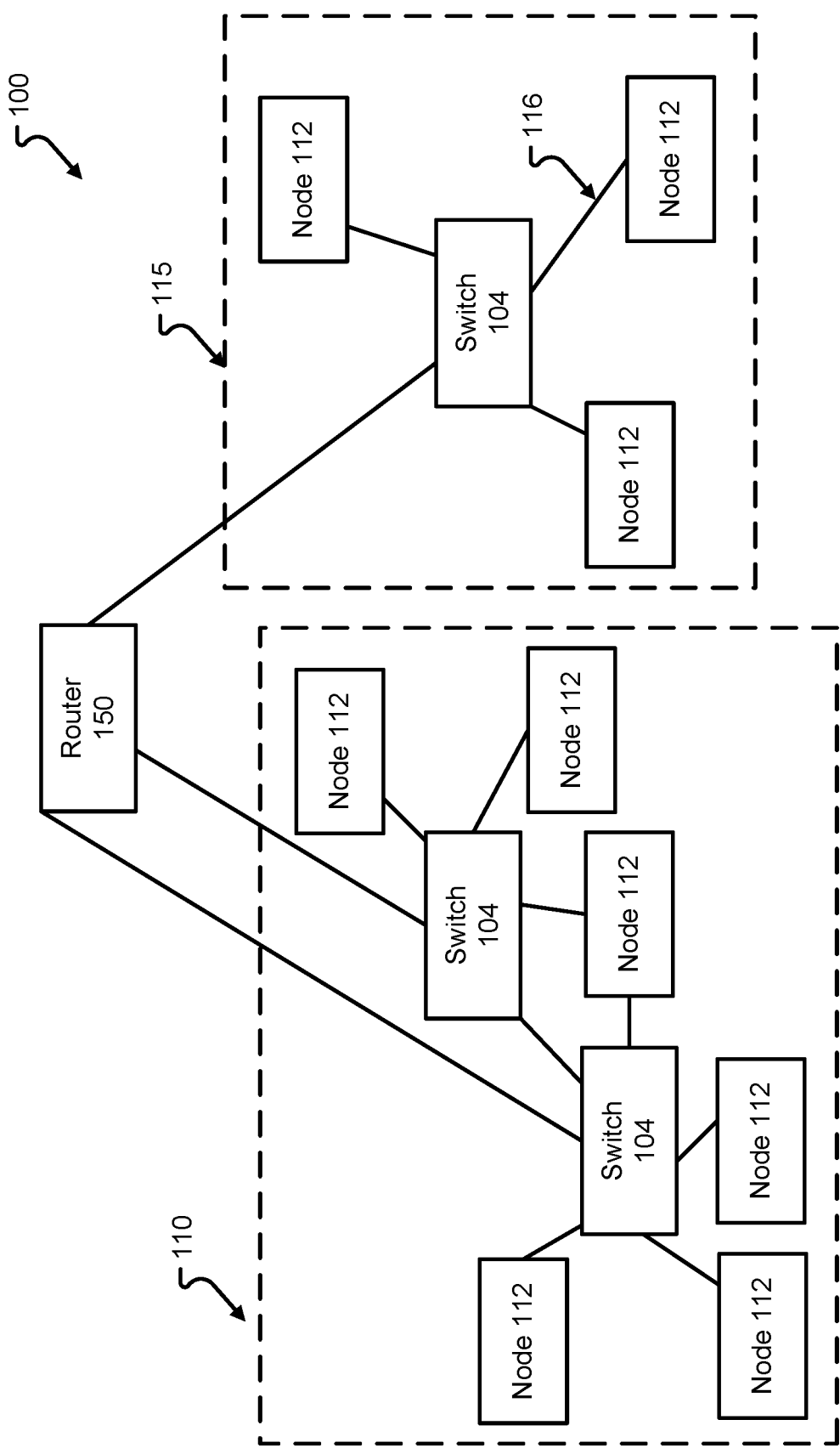
FIG. 1 is a block diagram depicting an illustrative configuration of a communication system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5, various systems and methods for routing packets between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

FIG. 1 illustrates a communication system 100 that includes a router 150 connecting subnets 110 and 115. The subnets 110 and 115 include nodes 112 (e.g., personal computers (PCs), servers, storage appliances, peripheral devices, etc.) and switches 104. Each node 112 may be configured with a host channel adapter (HCA). The subnets 110 and 115 may also include subnet managers (SM) not shown.

A switch 104 may correspond to an optical switch and/or electrical switch. In some embodiments, the switch 104 may include switching hardware that is configurable to selectively interconnect the plurality of ports, thereby enabling communications between the plurality of ports, which enables communications between the communication nodes 112. The switching hardware may include optical and/or electrical component(s) that are switchable between different matching configurations.

In some embodiments, the switch 104 may correspond to an optical circuit switch that may include a number of optical and/or opto-electronic components that switch optical signals from one channel to another. The optical and/or electrical components may be configured to provide an optical switching fabric, in some embodiments. As an example, the optical and/or electrical component(s) may be configured to operate by mechanically shifting or moving an optical fiber to drive one or more alternative fibers. Alternatively, or additionally, the optical and/or electrical component(s) may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components to facilitate switching between different matching configurations of optical channels.

In some embodiments, the switch 104 may correspond to an electrical switch, which means that the optical and/or electrical components may include a number of electrical components or traditional electronic circuitry that is configured to manage packet flows and packet transmissions. Accordingly, the optical and/or electrical components may alternatively, or additionally include one or more integrated circuit (IC) chips, microprocessors, circuit boards, data processing units (DPUs), simple analog circuit components (e.g., resistors, capacitors, inductors, etc.), digital circuit components (e.g., transistors, logic gates, etc.), memory devices, field programmable gate arrays (FPGAs), application specific integrated circuits (ASICs), combinations thereof, and the like.

Although not depicted, a communication node 112 may include a processor and memory. The communication nodes 112 are not shown with a processor and memory for ease of discussion and clarity of the drawings, but this should not be construed as limiting embodiments of the present disclosure.

A processor (whether provided in the switch 104 or a communication node 112) may be configured to execute the instructions stored in memory. As some non-limiting examples, the processor may correspond to a microprocessor, an IC chip, a central processing unit (CPU), a graphics processing unit (GPU), a DPU, or the like. The memory may correspond to any appropriate type of memory device or collection of memory devices configured to store instructions. Non-limiting examples of suitable memory devices that may be used for memory include flash memory, random access memory (RAM), read only memory (ROM), variants thereof, combinations thereof, or the like. In some embodiments, the memory and processor may be integrated into a common device (e.g., a microprocessor may include integrated memory).

Figure 2:
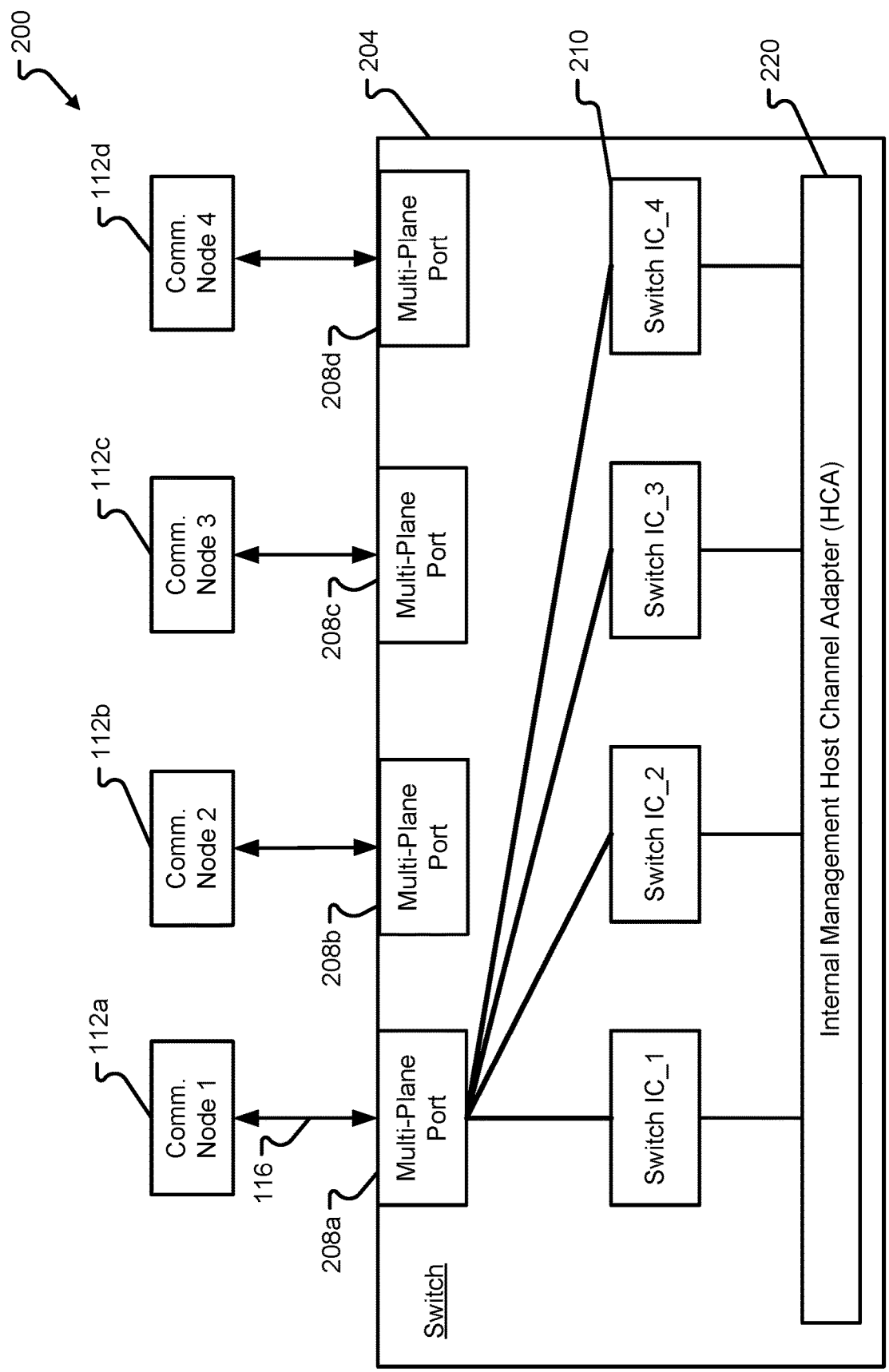
FIG. 2 is a block diagram depicting an illustrative configuration of a multiplane/managed switch in accordance with at least some embodiments of the present disclosure.

Referring to FIG. 2, a first possible configuration of a communication system 200 will be described in accordance with at least some embodiments of the present disclosure. It should be appreciated that the components described with reference to FIG. 2 may or may not also be used in a communication system 100 as shown in FIG. 1.

In the configuration of FIG. 2, a communication system 200 is shown to include a switch 104 connecting one or more communication nodes 112 via a number of multiplane ports 208a-d. Each multiplane port 208 may access each plane of the multiplane network via a respective switch IC 210. In an alternative configuration, ports 208 may be single plane ports connected to a respective switch IC 210. A switch integrated circuit (IC) should generally be understood to comprise switching hardware, such as an application specific integrated circuit (ASIC) that has switching capabilities. The multiplane switch 204 includes multiple smaller-bandwidth switch ICs 210 (e.g., switch IC 1-4) that, when taken collectively, have an aggregated bandwidth equal to the single high-bandwidth switch IC of a non-multiplane switch. Although, only connections between multiplane port 208a and each switch IC 210 is shown for clarity (while the other connects are not shown), each multiplane port 208 may be connected to each switch IC 1-4, (e.g., each multiplane port 208 can access each plane 1-4 of the multiplane switch). The switch 204 also includes an internal management host channel adapter (HCA) 220. The internal management HCA 220 may manage and communicate with various software interfaces used for different types of traffic within the system 200.

The illustrated switch 104 is shown to be connected with four communication nodes 112a-d via a plurality of communication ports 108a-d. The illustration of four communication nodes 112a-d is for ease of discussion and should not be construed as limiting embodiments of the present disclosure. Specifically, the switch 104 may be configured to connect any suitable number of communication nodes 112, and the switch 104 may include a number of ports 208 to facilitate such connections. Even more specifically, a switch 104 may be configured to connect a greater or lesser number of communication nodes 112 than are shown in FIG. 2. Moreover, embodiments of the present disclosure contemplate that not all ports 208 of a switch 104 need to be connected with a communication node 112. For instance, one or more ports 108 of a switch 104 may be left unconnected (e.g., open) and may not have any particular networking cable 116 plugged into the port 108.

The communication nodes 112a-d may be the same type of devices or different types of devices. As a non-limiting example, some or all of the communication nodes 112a-d may correspond to a Top-of-Rack (TOR) switch. Alternatively or additionally, one or more of the communication nodes 112a-d may correspond to a device other than a TOR switch. The communication nodes 112a-d do not necessarily need to communicate using the same communication protocol because the switch 104 may include components to facilitate protocol conversion and/or a communication node 112 may be connected to the switch 104 via a pluggable network adapter.

While the communication nodes 112a-d may correspond to a TOR switch, one or more of the communication nodes 112a-d may be considered host devices, servers, network appliances, data storage devices, or combinations thereof. A communication node 112, in some embodiments, may correspond to one or more of a personal computer (PC), a laptop, a tablet, a smartphone, a server, a collection of servers, or the like. It should be appreciated that a communication node 112 may be referred to as a host, which may include a network host, an Ethernet host, an InfiniBand (TB) host, etc. As another specific but non-limiting example, one or more of the communication nodes 112 may correspond to a server offering information resources, services and/or applications to user devices, client devices, or other hosts in the communication system 100. It should be appreciated that the communication nodes 112 may be assigned at least one network address (e.g., an IP address) and the format of the network address assigned thereto may depend upon the nature of the network to which the communication node 112 is connected.

Figure 3:
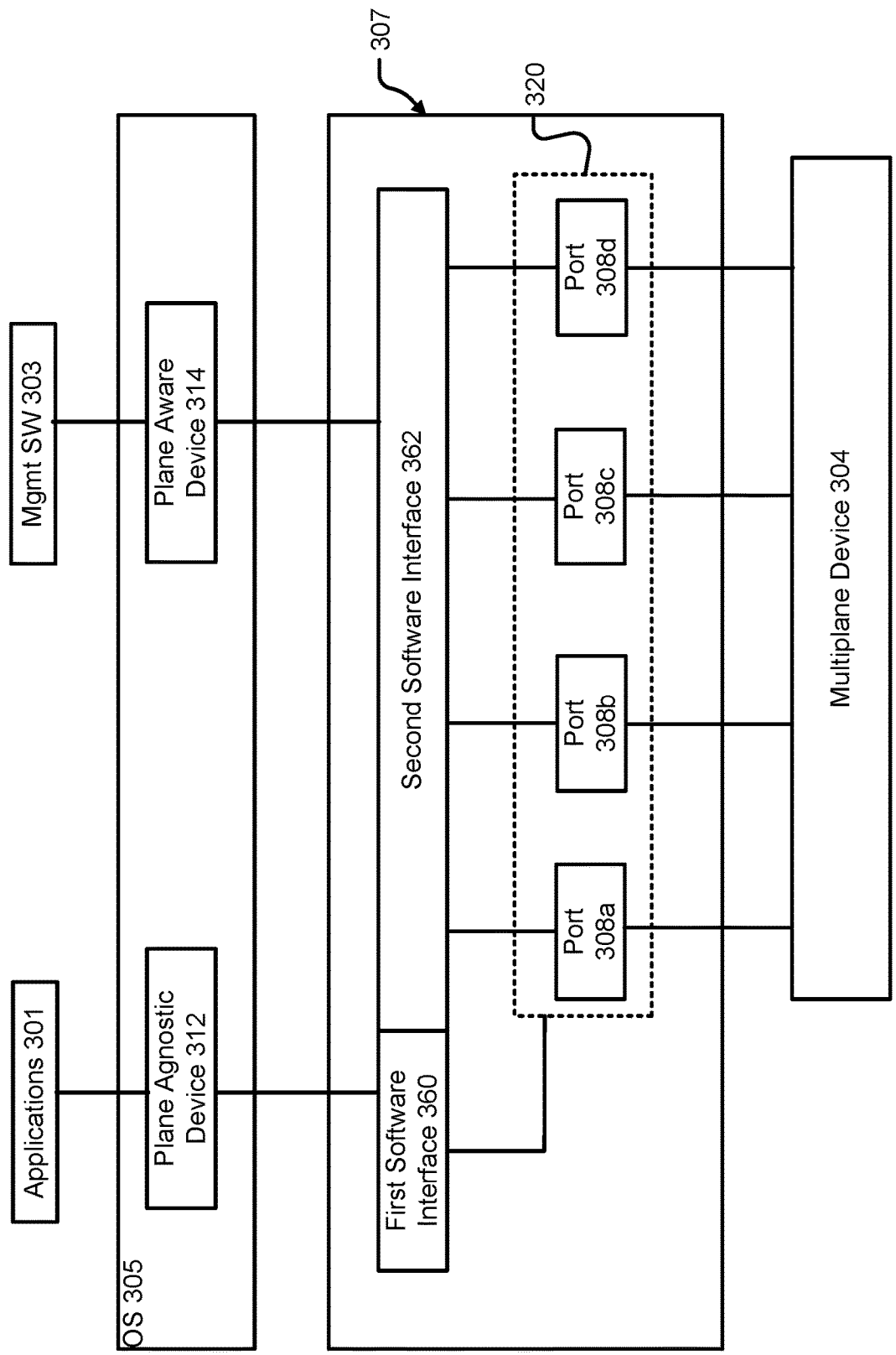
FIG. 3 illustrates a network device with dual software interfaces in accordance with at least some embodiments of the present disclosure.

FIG. 3 illustrates a host channel adaptor (HCA) 307 with dual software interfaces 360/362 for separating network management traffic and communication traffic in a multiple plane/planarized network in accordance with the present disclosure. The HCA 307 includes a first software interface 360 that connects the aggregated port 320 with the network stack/RDMA/IPoIB applications 301 and a second software interface 362 that connects the individual planes with management software and tools 303. In embodiments, the HCA 307 may be connected to a multiplane device 304.

Between the HCA 307 and the applications 301/management software 303 is operating system (OS) 305. From the perspective of the OS 305, the HCA 307 is presented as two separate devices 312 and 314. The device 312 is plane agnostic, meaning traffic directed to the device 312 is not directed to a specific plane. Conversely, the device 314 is plane aware, meaning traffic directed to the device 314 is directed to a specific plane.

In the HCA 307, the plurality of ports 308a-d may each be associated with a separate plane (e.g., planes a-d). Depending on which software interface 360/362 a device accesses the HCA 307 through, the ports 308a-d may appear as a single port (e.g., aggregated port 320) or as separate ports each associated with a plane. Although four planes are illustrated, it understood that a network may have more or fewer planes. Additionally, although each plane is illustrated with one associated port, it is understood that different configurations are possible. In some embodiments, a multi-plane device 304 can embed an HCA (e.g., HCA 307) and run its own SM.

The first software interface 360 routes a first type of traffic (e.g., communication traffic). In embodiments, the first software interface 360 interacts with high level applications (e.g., applications 301). The first type of traffic is not directed to a specific plane, and the first software interface 360 presents the plurality of ports 308a-d as a single plane agnostic port 320. Traffic routed via the first software interface 360 may be routed using an algorithm that automatically selects a port/plane based on network configuration rules (e.g., load-balancing, latency, etc.).

The second software interface 362 routes a second type of traffic (e.g., network management traffic). In embodiments, the second software interface interacts with low level network management applications (e.g., management software 303). The second type of traffic is directed to a specific plane, and therefore must be directed to a specific port. The second software interface 362 presents each port in the plurality of ports 308a-d as a separate port.

In other words, the first software interface 360 is for traffic that is not directed to a specific plane, and the second software interface 362 is for traffic that is directed to a specific plane. For example, a SM may need to access a specific plane via the second software interface 362. Whether the traffic is the first or second type may be determined based on packet type. In embodiments, In embodiments, the aggregated port 320 uses a single local identifier (LID), and LID-routed packets can use any plane and are routed via the first software interface 360. Thus, the plane for the LID-routed packets is chosen to dynamically balance the load. In contrast, the management software 303 is routed using direct route management datagram (MAD) path information, which use source routing to select the path to the destination when it needs to reach a specific port on a specific plane.

Figure 4:
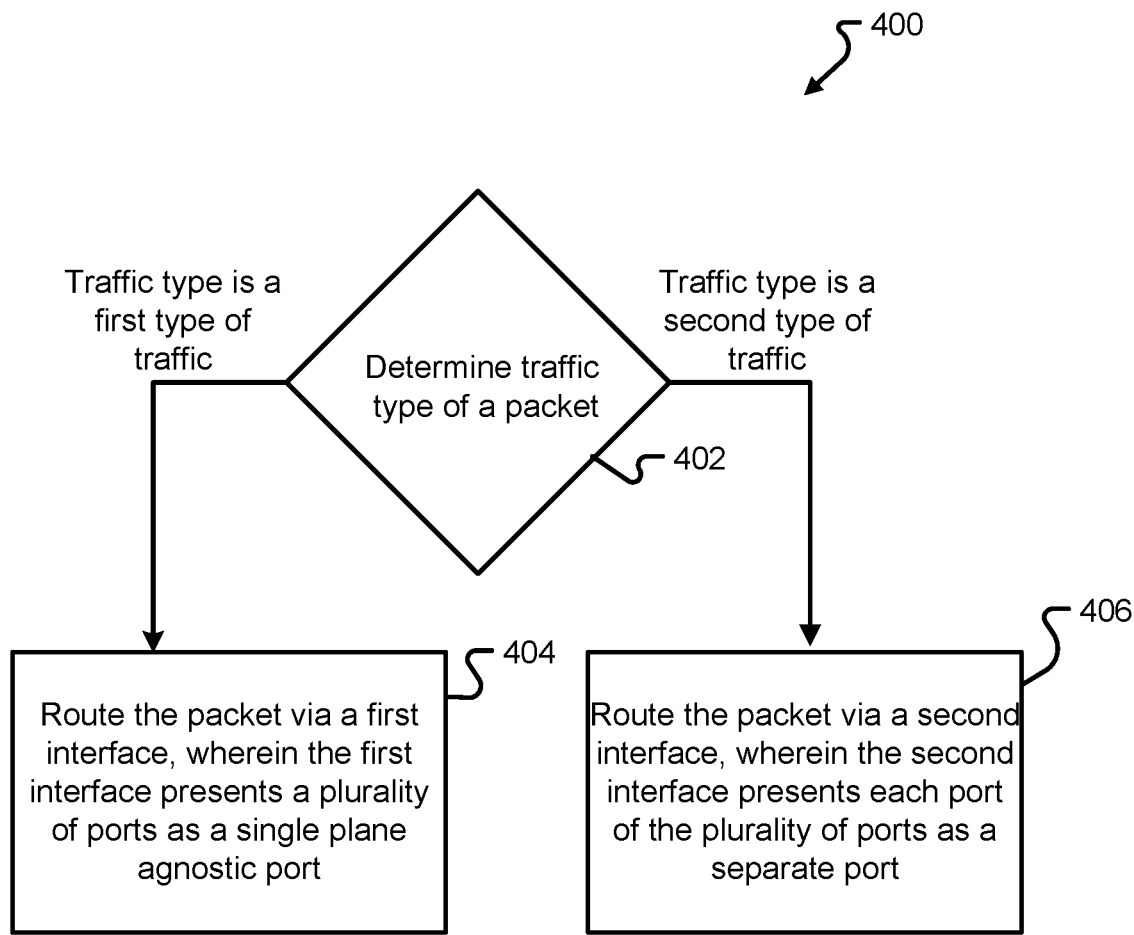
FIG. 4 is a flow diagram depicting a method of routing packets in accordance with at least some embodiments of the present disclosure.

Referring now to FIG. 4, an illustrative method 400 will be described in accordance with at least some embodiments of the present disclosure. The method 400 may be performed in a HCA 307.

The order of operations depicted in FIG. 4 should not be construed as limiting embodiments of the present disclosure. For instance, certain steps may be performed in a different order without departing from the scope of the present disclosure. Furthermore, some steps may be performed in parallel (e.g., simultaneously) with one another.

The method 400 begins by determining a type of traffic for a packet (step 402). Interfaces (e.g., the first software interface 360 and the second software interface 362) typically connect two components together. Traffic may be of a first type or a second type. In embodiments, the first type of traffic includes data traffic from an application and the second type of traffic includes low-level management traffic.

The method 400 may continue by routing a first type of traffic (e.g., packets) via a first software interface 360, wherein the first software interface 360 presents the plurality of ports 308a-d as a single plane agnostic port 320 to applications 301 (step 404). The method 400 may further include routing a second type of traffic via a second interface 362, wherein the second interface 362 presents each port 308a-d as a separate port (step 406). The method 400 may further include routing from a source communication node 112 to a destination communication node 112 (not shown).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A network device, comprising:
   a plurality of ports to facilitate communication over a network including a plurality of planes, wherein each port in the plurality of ports communicates over a plane in the plurality of planes;
   a first interface to manage the plurality of ports, wherein the first interface presents the plurality of ports as a single port to software; and
   a second interface to manage the plurality of ports, wherein the second interface presents each port in the plurality of ports as a separate port to the software.

2. The network device of claim 1, wherein the first interface handles a first type of traffic, and the second interface handles a second type of traffic.

3. The network device of claim 2, wherein the first type of traffic is different from the second type of traffic.

4. The network device of claim 2, wherein the first type of traffic comprises communication traffic.

5. The network device of claim 2, wherein the first type of traffic comprises Remote Direct Memory Access (RDMA).

6. The network device of claim 1, wherein the plurality of ports presented as the single port to the software comprises a plane agnostic port.

7. The network device of claim 2, wherein the second type of traffic comprises network management traffic.

8. The network device of claim 1, wherein the network device comprises a switch.

9. The network device of claim 1, wherein the network device comprises a host channel adapter (HCA).

10. The network device of claim 1, wherein a subnet manager (SM) interacts with the second interface.

11. The network device of claim 1, wherein the plurality of ports are grouped into one or more sets of ports, and wherein each set of ports represents a different logical port.

12. A system for routing traffic, comprising:
    a network device including:
       a plurality of ports to facilitate communication over a plurality of planes in a network, wherein each port in the plurality of ports communicates over a plane in the plurality of planes;
       a first interface to manage the plurality of ports, wherein the first interface presents the plurality of ports as a single plane agnostic port to software; and
       a second interface to manage the plurality of ports, wherein the second interface presents each port in the plurality of ports as a separate port to the software.

13. The system of claim 12, wherein the first interface handles a first type of traffic, and the second interface handles a second type of traffic, and wherein the first type of traffic is different from the second type of traffic.

14. The system of claim 13, wherein the first type of traffic comprises communication traffic or Remote Direct Memory Access (RDMA).

15. The system of claim 12, wherein the network device comprises a server.

16. The system of claim 13, wherein the second type of traffic comprises network management traffic.

17. The system of claim 12, wherein a subnet manager (SM) interacts with the second interface.

18. A method for routing data traffic, comprising:
    routing the data traffic over a multiplane network via a plurality of ports;
    routing a first type of traffic via a first interface, wherein the first interface presents the plurality of ports as a single plane agnostic port to software; and
    routing a second type of traffic via a second interface, wherein the second interface presents each port in the plurality of ports as a separate port.

19. The method of claim 18, wherein the first type of traffic comprises communication traffic, and the second type of traffic comprises network management traffic.

20. The method of claim 18, wherein the multiplane network comprises a plurality of planes, and wherein the second interface exposes each plane in the plurality of planes as a separate port.

* * * * *